United States Patent [19]

Ikeda

[11] Patent Number: 4,594,759
[45] Date of Patent: Jun. 17, 1986

[54] SURFACE-CHISELING MACHINE

[76] Inventor: Hideaki Ikeda, No. 4-16-17, Kinshi, Sumida-ku, Tokyo, Japan

[21] Appl. No.: 765,598

[22] Filed: Aug. 14, 1985

[30] Foreign Application Priority Data

Apr. 13, 1985 [JP] Japan .................. 60-79015

[51] Int. Cl.⁴ .............................. B21C 43/00
[52] U.S. Cl. ....................... 29/81 D; 125/6; 173/101
[58] Field of Search .............. 125/1, 6, 7; 173/101; 29/81 D

[56] References Cited

U.S. PATENT DOCUMENTS

| | | | |
|---|---|---|---|
| 3,023,485 | 3/1962 | Barthod | 29/81 D |
| 3,343,246 | 9/1967 | Kelley | 29/81 D |
| 3,571,874 | 3/1971 | Von Aix | 29/81 D |
| 3,680,643 | 8/1972 | Cameron | 29/81 D |

FOREIGN PATENT DOCUMENTS

5883/62 2/1967 Japan .
48-54371 7/1973 Japan .

Primary Examiner—Harold D. Whitehead

[57] ABSTRACT

A surface-chiseling machine for refractory, concrete or other materials is disclosed, which includes a piston having at its one end a step portion and on a side periphery at its other end a through-hole, and a cylinder forming a first air chamber on a closed side of the step portion of the piston, forming an exhaust channel communicated with the through-hole of the piston and having an air hole for feeding a compressed air to the first air chamber. The cylinder at its rear end is closed with a back head for forming therein a second air chamber, while at its front end is closed with a front head which is provided with a plurality of chisel-inserting holes, into which are inserted chisels with their rear ends being contactable directly with a front face of the piston for providing a striking action on the chisels.

5 Claims, 8 Drawing Figures

SURFACE-CHISELING MACHINE

FIELD OF THE INVENTION

This invention relates to a surface-chiseling machine for scraping a surface of concrete, refractory or other materials, such as a concrete wall and a caster material for a kettle in an ironworks.

BACKGROUND OF THE INVENTION

There has previously been known a portable multi-needle chisel, as disclosed in the Japanese Opened Utility Model Application No. 54371/73, having a similar construction to the conventional surface-chiseling machine for a refractory, a concrete or other materials in different usage. As shown in FIG. 1, such type of multi-needle chisel includes a main body 14 having a piston 12 contacted with a special cam 10 in association with a motor, which body 14 is provided with a protective cylinder 16. Within the cylinder 16 are movably arranged a carriage 20 for mounting a number of striking needles 18, as well as a hammer 22, while the cylinder 16 at its front end is provided removably with a stop cylinder 28 having a contact portion 30. Between the contact portion 30 and the carriage 20 is arranged a spring 32.

Thus, in such type of chiseling machine the carriage 20 is urged against the hammer 22 by a resilient force of the spring 32, so that the striking action of the hammer 22 for moving the carriage 20 forward may be recovered by the spring 32 for moving the carriage 20 backward, thereby to reciprocate the chiseling needles 18. Since the chiseling needles 18 are kept in a free state between the carriage 20 and the hammer 22, an efficient chiseling action can not be achieved unless the chiseling needles 18 at their front ends are urged against an object to be chiseled, while at their bases are contacted with the hammer 22. For example, when the piston 12 produces 2000 strikes per minute, vibration of the protective cylinder 16 generated by the striking action may reduce the striking number to about one third, i.e. about 7000 strikes per minute, which have the striking action on the needles 18. The remaining 1300 strikes per minute are ineffective. Thus, the conventional multi-needles 18 at their front ends must be always urged against the object to be chiseled for achieving the efficient operation.

There has also been proposed a tool utilizing the same type of chiseling needles in combination with an air pressure for reciprocating a piston in a cylinder in order to avoid or reduce wear of a striking mechanism and to reduce noise.

From this point of view, the inventor has developed a surface-chiseling machine for refractory, concrete or other materials, which may produce a striking action of an air pressure on a plurality of chisels and may control the striking action for achieving its efficient operation and improve its durability.

A typical machine of such type is illustrated in FIG. 2 of the accompanying drawings. This surface-chiseling machine includes a hammer body 44 for reciprocating a piston 42 by feeding compressed air alternately before or behind the piston 42 in a cylinder 40, a carriage cylinder 46 extending longitudinally in front of the hammer body 44, a tapet 50 arranged movably in the carriage cylinder 46 and having a rear end contacted with a front end of the piston 42 inserted into an opening 48 at a rear portion of the carriage cylinder 46, a holder 52 attached to a front end of the carriage cylinder 46 and having a plurality of longitudinal chisel-holding holes 54 for allowing the chisels 56 to reciprocate therein in contact with the tapet 50, a first air chamber 60 defined between a step portion 58 protruded from a rear portion of the tapet 50 and an inner circumference of the carriage cylinder 46, a second air chamber 64 defined between a step portion 62 protruded from a rear portion of each chisel 56 and an inner circumference of each chisel-holding hole 54, the first and second air chambers 60 and 62 being fed with the compressed air for urging the tapet 50 and the respective chisel 56 backward so that the chisel 56 may strike forward through a striking movement of the tapet 50 generated by a reciprocating movement of the piston 42, as well as a pipe 66 arranged axially through centers of the piston 42 in the hammer body 44 and of the tapet 50 in the carriage cylinder 46, which pipe at its front end is passed through an opening 68 of the holder 52 for feeding fluid or sucking dusts.

In the surface-chiseling machine thus constructed, the compressed air to be fed to the hammer body 44 is introduced into an inlet 70 and then divided into a stream on the hammer side and another stream on the carriage cylinder side. The latter stream is introduced alternately in front of or behind the piston 42 through switching operation of a valve 72 utilizing a cushion pressure, thereby to reciprocate the piston 42 for striking the tapet 50. On the other hand, the air stream on the hammer side is fed through the cylinder 40 and the carriage cylinder 46 into the first air chamber 60 for urging the tapet 50 constantly against the piston 42 with an adequate force by the step portion 58 of the tapet 50. Further, the compressed air remains in a peripheral groove 74 and is fed through an air channel 76 of the holder 52 into the second air chamber 64 for urging the chisel 56 constantly against the tapet 50 with an adequate force by the step portion 62 of the chisel 56.

The tapet 50, which has been subjected to a striking action of the reciprocating piston 42, may transmit the striking action to the chisel 56 which in turn is moved forward against an urging air pressure in the second air chamber 64 to effect a chiseling action on the object, such as a concrete surface. After the striking action, the chisel 56 is immediately retreated by the urging air pressure in the second air chamber 64 and then contacted with the front end of the tapet 50 for repeating the striking cycle. In this case, the tapet 50 is normally set at a striking position of the carriage cylinder 46 and urged toward a recess of the carriage cylinder, i.e. the piston 42, with an adequate pressure of the compressed air fed into the first air chamber 60. The tapet 50 subjected to the striking action may move forward against the air pressure to strike the chisel 56 and then immediately retreated to the initial striking position by the compressed air in the first air chamber 60 for repeating the striking cycle.

Thus, in such type of surface-chiseling machine, the striking force on the object is highest at the chisel 56 just subjected to the striking action of the tapet 50. However, the chisel 56 at its step portion 62 is normally subjected to the backwardly urging pressure and becomes weak in its striking force during its forward movement, resulting in the lowest striking force at the chisel 56 with its step portion 62 being close to the front portion of the respective chisel-holding hole 54. Therefore, the chisel 56 on the way has an intermediate striking force. If the striking force of the tapet 50 is set much larger than the urging force against the step portion 62 of each chisel 56 in the second air chamber 64, the chisel 56 may move forward vigorously to strike the object and thereafter retreat immediately by the urging air pressure. Thus, the plurality of chisel 56 may be individually subjected to the striking action of the tapet 50 and scrape the surface of the object, such as a concrete wall, a caster material of a kettle in an ironworks and other solid materials.

In particular, the surface-chiseling machine thus constructed is advantageous in that more than ten chisels 56 may be normally contacted with the tapet 50 while each chisel may be actuated efficiently with a fewer chisels being idle, and in that each chisel 56 may be retreated by a constant force of the compressed air for achieving its smooth reciprocating movement. However, in order to impart the required stroke to the chisels 56 in this type of surface-chiseling machine and to generate enough striking force by the compressed air, the larger volume of the cylinder 40 for receiving the piston 42 and of the carriage cylinder 46 for receiving the tapet 50 is necessary, resulting in a totally larger construction which causes a larger mechanical damage during operation and requires replacement of the worn components, leading to troublesome and time-consuming maintenance. Further, the surface-chiseling machine requires widely variable striking performance of the chisels 56 depending on diversified applications, in which the chisels 56 may be conveniently reciprocated depending on the type of objects with a simple mechanism and a convenient maintenance. Further such machine should be manufactured in a low cost.

Accordingly, an object of the invention is to provide a surface-chiseling machine for a refractory, a concrete or other materials, in which the chisels may be reciprocated to produce a required striking force by means of a simple pneumatic mechanism, and which is convenient in maintenance and may be manufactured in a low cost for many purposes.

SUMMARY OF THE INVENTION

For achieving the above object, the invention provides a surface-chiseling machine for refractory, concrete or other materials, which comprises a piston having at its one end a step portion and on a side periphery at its other end a through-hole, and a cylinder forming a first air chamber on a closed side of the step portion of aid piston, forming an exhausting channel communicated with the through-hole of said piston and having an air hole for feeding a pressure air to said first air chamber, said cylinder at its rear end being closed with a back head for forming therein a second air chamber while at its front end being closed with a front head which is provided with a plurality of chisel-inserting holes, into which holes are inserted chisels with their rear ends being contactable directly with a front face of said piston, each of said chisel at its rear end being provided with a protruded step to form on its one side a third air chamber for normally, urging the chisel against the piston, said first and third air chambers being continuously fed with the pressure air for reciprocating said piston in a stroke in which the second air chamber formed by said piston is communicated alternately with the exhausting channel or the first air chamber via the through-hole, thereby to strike the chisel.

For better understanding, the invention will be described in more detail with reference to the accompanying drawings.

PREFERRED EMBODIMENTS OF THE INVENTION

Figure 1:
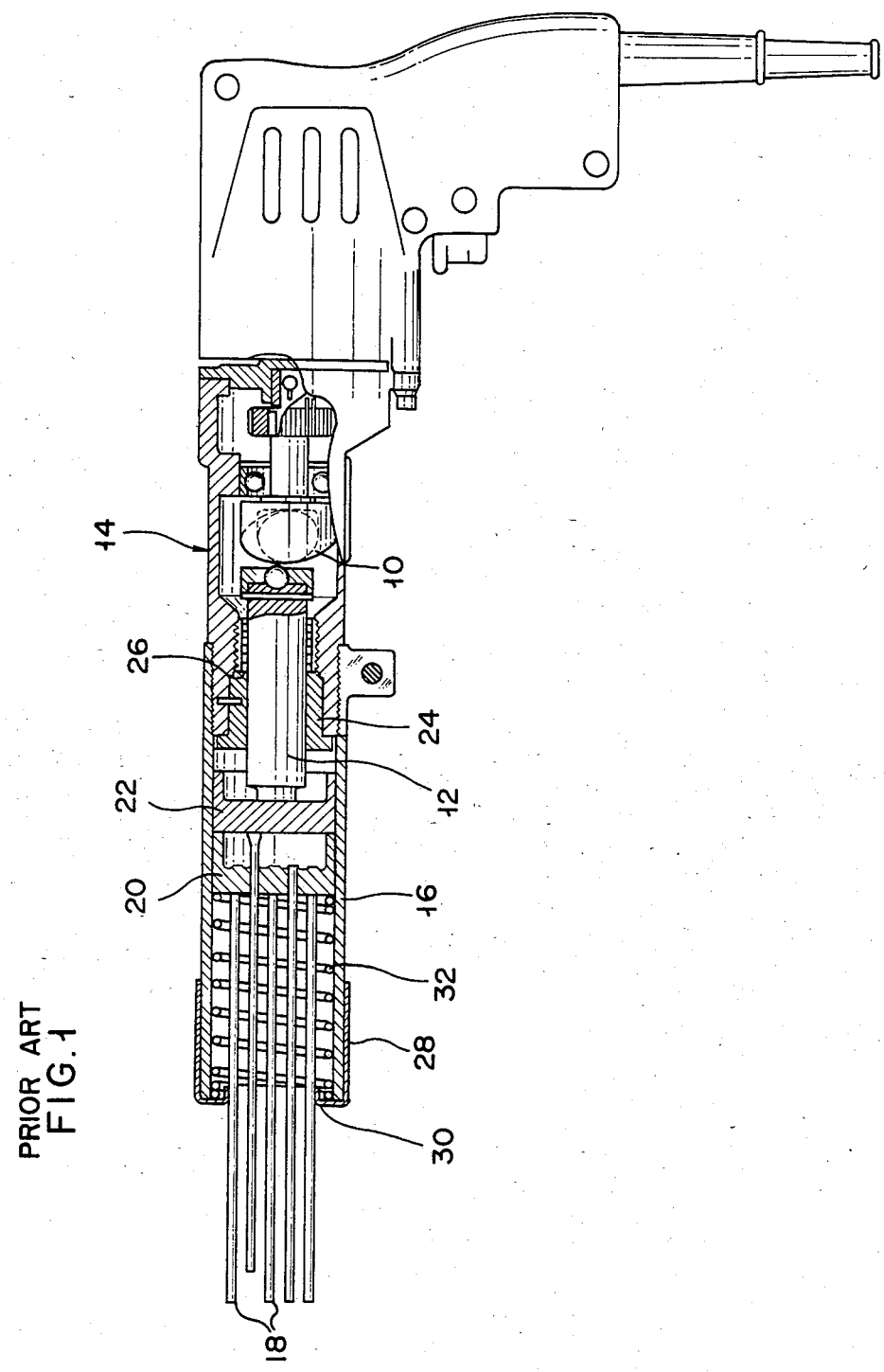
FIG. 1 is a sectional view of a main portion of the conventional portable multi-needle chisel.
Figure 2:
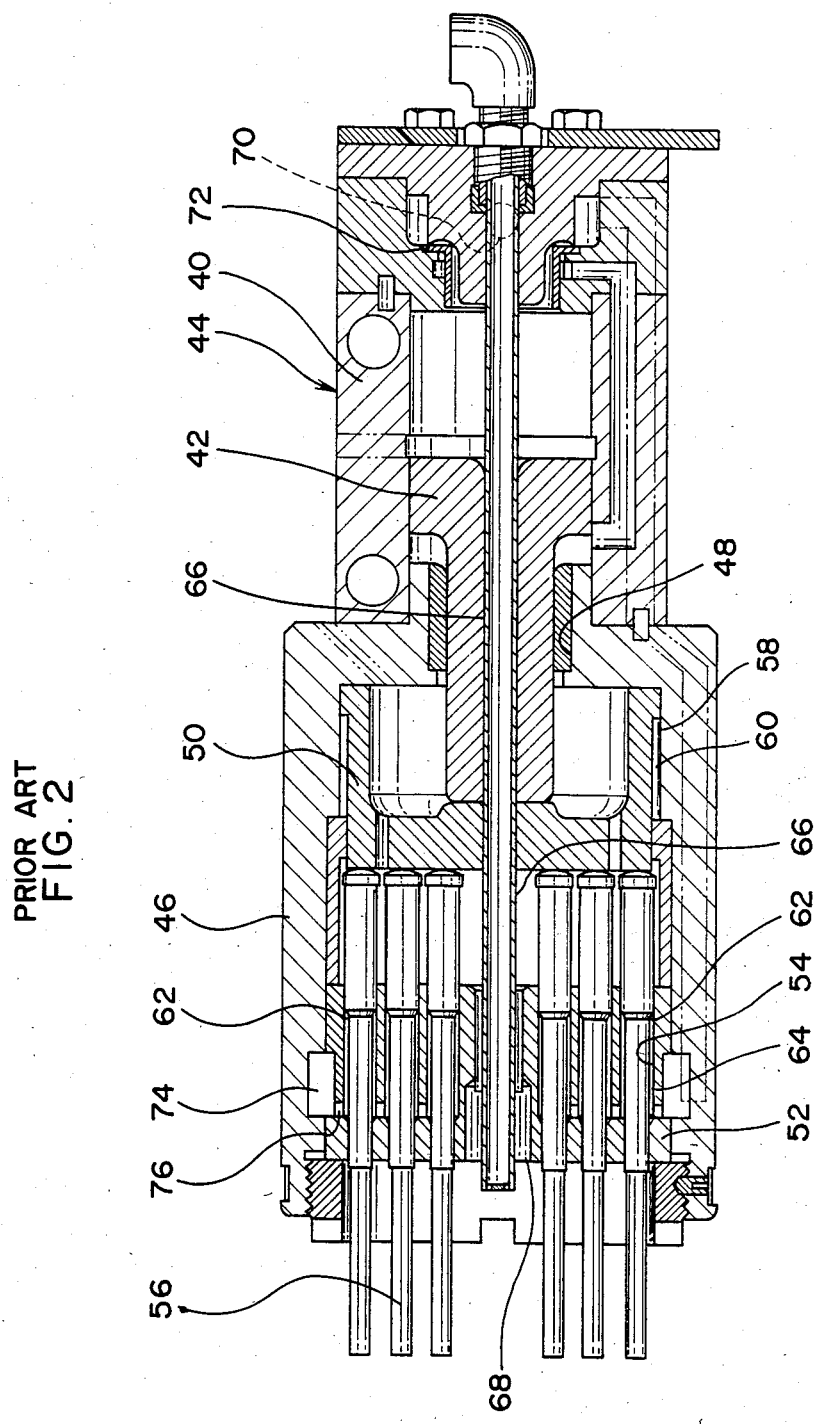
FIG. 2 is a sectional side view of a main portion of the conventional surface-chiseling machine.
Figure 3:
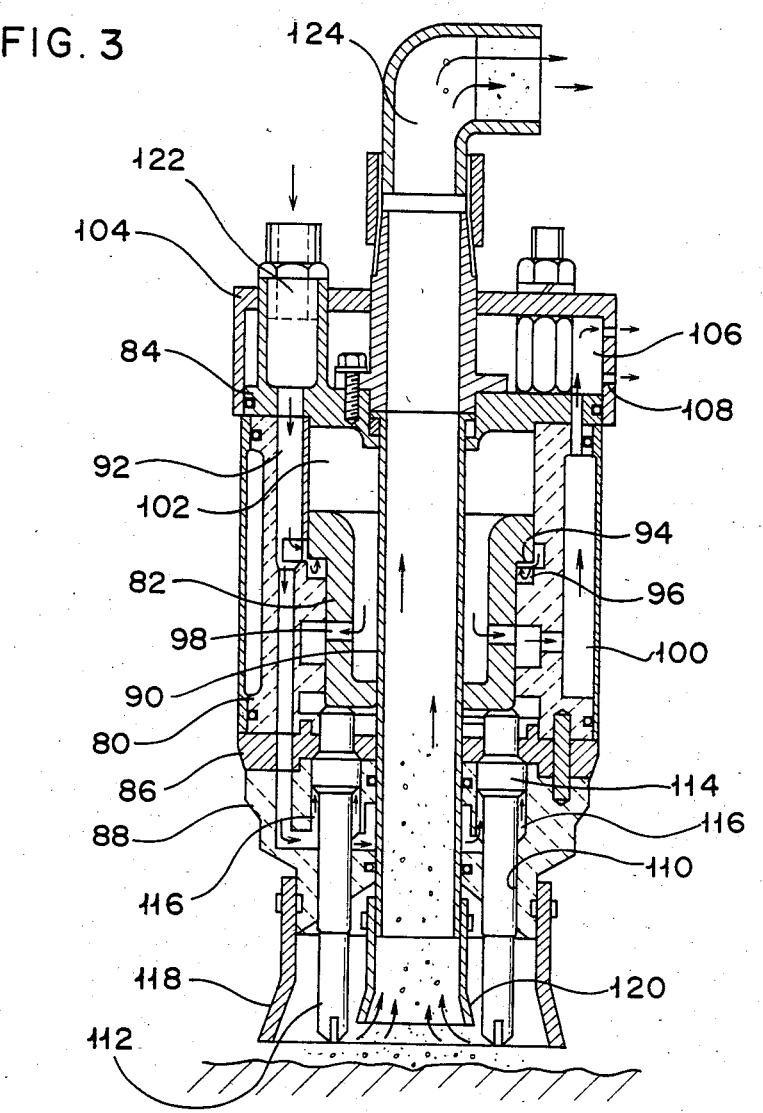
FIG. 3 is a sectional side view of a main portion of one embodiment of the surface-chiseling machine according to the invention.
Figure 4:
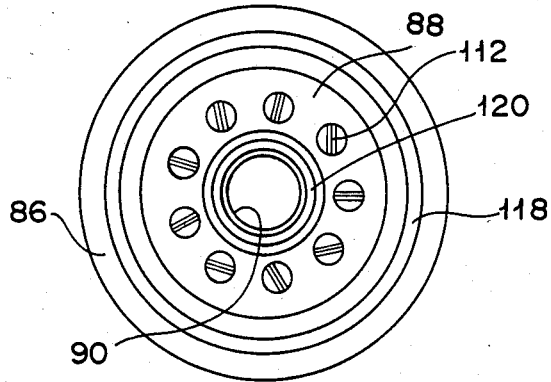
FIG. 4 is a bottom view of the machine in FIG. 3 showing arrangement of chisels.

FIGS. 3 and 4 shows one embodiment of the surface-chiseling machine according to the invention, in which a reference numeral 80 represents a cylinder to be supplied therein with a compressed air for reciprocating a piston 82. The cylinder 80 at its rear end is closed by a back head 84, while at its front end is closed by a front head 88 through a cylinder bushing 86. The piston 82 in the cylinder 80 has a hat shape, through which is passed a dust tube 90 having its one end opened at a front end of the front head 88 and other end communicated through the back head 84 with an atmosphere. The cylinder 80 at its one end is provided with a vent hole 92, a part of which is communicated with a first air chamber 96 formed by a step portion 94 which in turn is arranged exteriorly at an upper portion of the piston 82. On the other hand, the piston 82 at its lower side is provided circumferentially with a through-hole 98. The piston 82 at its lower position relative to the cylinder 80 is communicated with an exhaust channel 100 arranged on a periphery of the cylinder 80, while the piston 82 at its upper positon relative to the cylinder 80 is communicated with the first air chamber 96. Thus, a second air chamber 102 is formed within the cylinder 80 through the hole 98. The exhaust channel 100 on the periphery of the cylinder 80 is communicated through the back head 84 with an exhaust chamber 106 formed by a back head cover 104 having a hole 108, through which the external exhaustion may be effected. The cylinder bushing 86 and the front head 88 in front of the cylinder 80 are provided at a periphery of the dust tube 90 with a plurality of chisel-inserting holes 110, into which are movably inserted chisels 112 (FIG. 4). In this case, each chisel 112 at its rear end is positioned in contact with a front end of the piston 82. The chisel 112 at its one side on the rear end is provided with a protruded step portion 114 which may move together with the chisel 112 in the same stroke. Thus, the step portion 114 of the chisel 112 at its lower side is communicated with a vent hole 92 to form a third air chamber 116.

The front head 88 at its front periphery is provided with a dust-protection covering 118 so as to surround the chisel 112, while the dust tube 90 at its front end is provided with a dust-suction covering 120 at a slightly inner position of the covering 118. A reference numeral 122 represents an air tube for feeding the compressed air into the vent hole 92 of the cylinder 80, while a reference numeral 124 represents a dust-guide pipe communicated with the dust tube 90.

Operation of the surface-chiseling machine thus constructed will be described hereinbelow.

At first the air tube 112 is connected to a suitable air source for feeding the compressed air into the vent hole 92 of the cylinder 80, so that a portion of the compressed air may flow into the step portion 94 of the piston 82 or the first air chamber 96, thereby to push the piston 82 up. During this period, the third air chamber 116 formed relative to the protruded step portion 114 of the chisel 112 is also fed with a portion of the compressed air through the vent hole 92, thereby to push all chisels 112 up. When the piston 82 is pushed up, its front end is spaced apart from the rear end of the chisel 112 and at a certain position the hole 98 of the piston 82 is communicated with the first air chamber 96. Simultaneously, the compressed air flows through the hole 98 into the piston 82 or the second air chamber 102 thereby to rapidly increase a pressure therein and to rapidly urge the piston 82 downward for striking the rear end of the chisel 112. Through the striking action, the chisel 112 is urged downward against an air pressure in the third air chamber 116. When the piston 82 is pushed down to a certain position, the hole 98 is communicated with the exhaust channel 100 and the compressed air in the second air chamber 102 is immediately exhausted. Simultaneously, the first air chamber 96 is again fed with the compressed air to push the piston 82 up. During this period, the chisel 112 is again pushed up by feeding the compressed air into the third air chamber 116. Such operation may be successively repeated for the chisels 112 to strike an object with an adequate striking force, thereby to chisel or scrape its surface.

Thus, in accordance with the invention, the piston 82 itself has function of a switch valve of the compressed air for its reciprocating movement in a given stroke. Further, the piston 82 at its front end may strike the chisel 112 directly, so that the simple construction, as well as the improved and efficient striking action may be achieved, resulting in a compact and efficient machine.

In accordance with the invention, the dusts generated during the chiseling action by the chisel 112 on the object may be prevented by the duct-protection covering from scattering and sucked smoothly by the dust-suction covering 120 into the dust tube 90, through which the dusts may be collected into a suitable dust collector.

Figure 5:
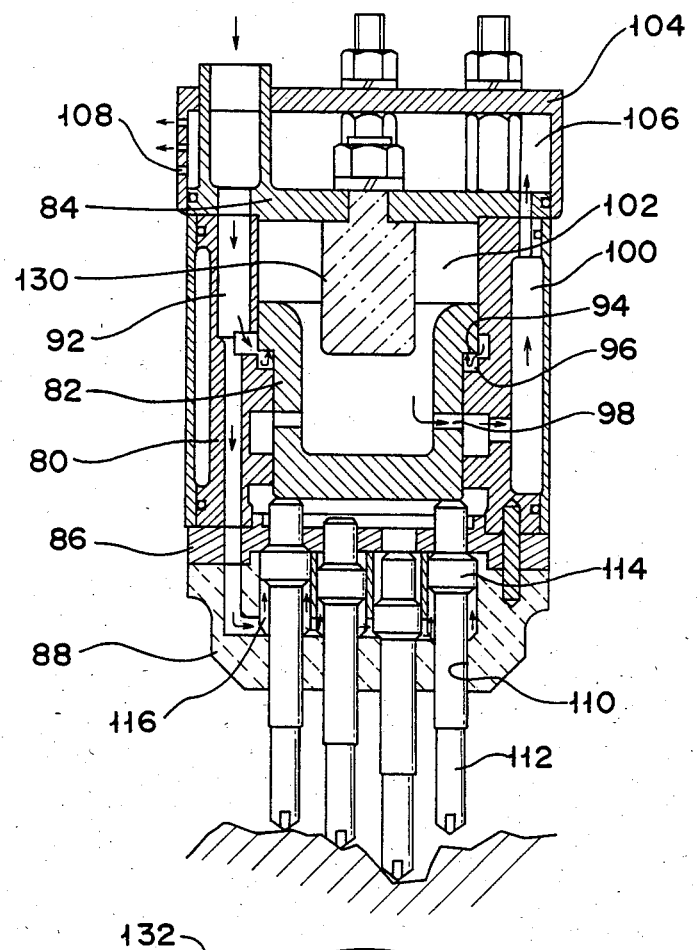
FIG. 5 is a sectional side view of a main portion of another embodiment of the surface-chiseling machine.
Figure 6:
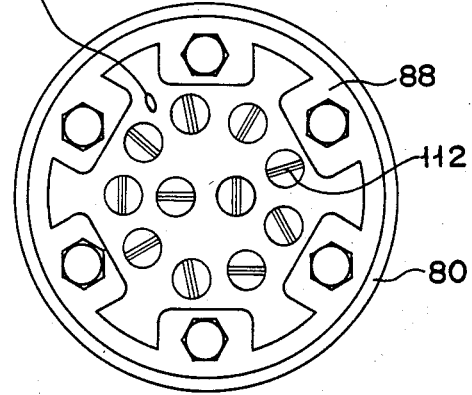
FIG. 6 is a bottom view of the machine in FIG. 5 showing arrangement of chisels.

FIGS. 5 and 6 illustrate a modified embodiment of the surface-chiseling machine, in which the dust tube passing centrally through the cylinder 80 and the piston 82 is omitted, while the back head 84 at its center is provided on the inner side of the cylinder with a back head plug 130 for adjusting a volume of the second air chamber 102. Other construction is identical to that of FIG. 3 and is omitted for its description. The surface-chiseling machine according to the embodiment of FIG. 5 may be operated similarly to that of FIG. 3. However, in this embodiment, the dust-protection covering is omitted and instead the front head 88 is provided with a sprinkler orifice 132 as a dust-protection means, as shown in FIG. 6, for spraying water therethrough onto the object. The surface-chiseling machine of this embodiment is very simple compared with the previous embodiment and may be manufactured in a low cost, so that it may be conveniently used for such objects that do not generate dusts or require dust-collection.

Figure 7:
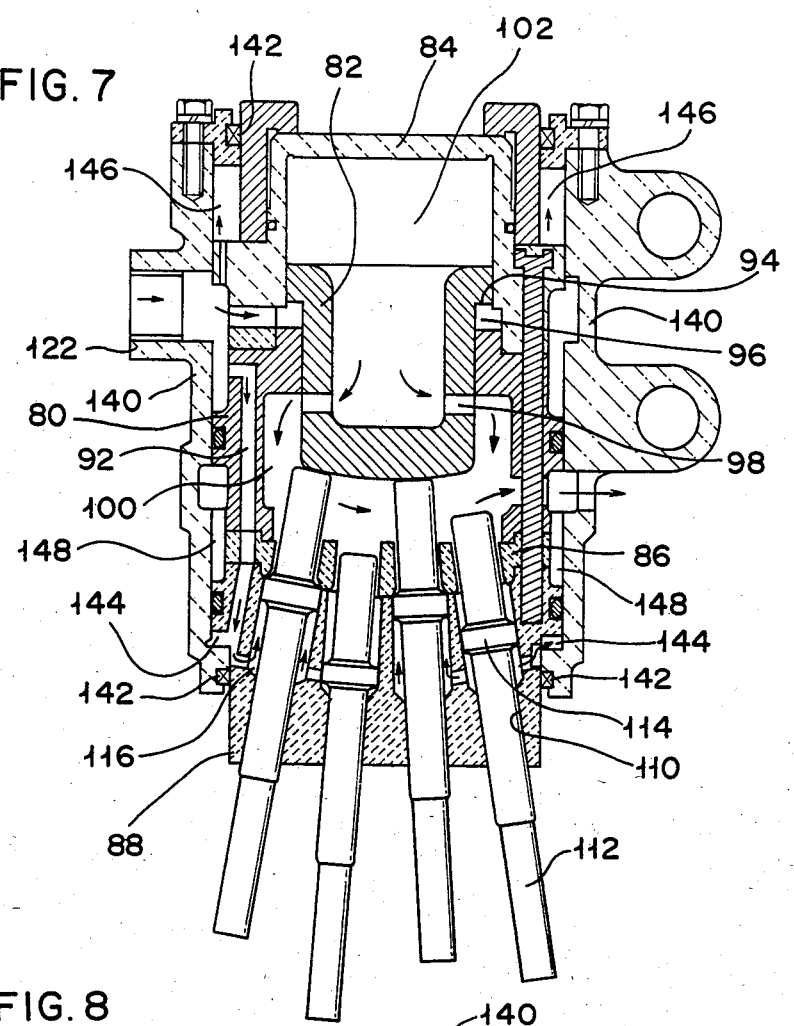
FIG. 7 is a sectional side view of a main portion of a further embodiment of the surface chiseling machine.
Figure 8:
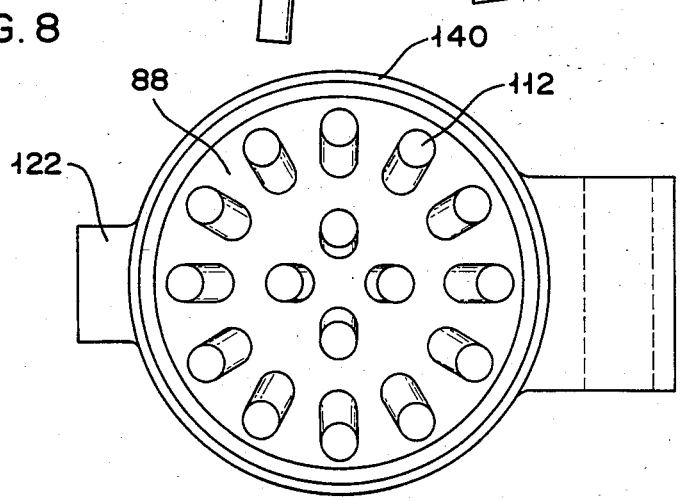
FIG. 8 is a bottom view of the machine in FIG. 7 showing arrangement of chisels.

FIGS. 7 and 8 illustrate a furthrer modified embodiment of the surface-chiseling machine according to the invention, in which the cylinder 80 is surrounded by a cylinder cover 140, which at its front and rear ends are air-tightly mounted to the back head 84 and the front head 88, respectively, through seal packings 142. In this case, the cylinders 80 form air chambers 114, 146 communicated with the vent hole 92 and an exhaust chamber 148 communicated with the exhaust channel 100 so as to be movable in the forward and backward directions, while the cylinder 80 is provided circumferentially with an O-ring 150. Further, in this embodiment, the chisel-inserting holes 110 arranged at the cylinder bushing 86 and at the front head 88 are radially arranged for setting the chisels 112 divergently. The piston 82 at its front face for striking the chisels 112 is preferably in a curved or tapered shape, as illustrated. Other construction is identical to that in the previous embodiments and is omitted for its description. In accordance with this embodiment of the surface-chiseling machine, the cylinder 80 at its front and rear ends is supported by the air pressure through the air chambers 114, 146 by means of the cylinder cover 140, so that the latter may be fixed to allow the front end of the chisel 112 to be contacted with the object and to move forward and backward by air cushion, thereby to avoid concentration of excessive stress onto the chisel 112. For this reason, the surface-chiseling machine of this embodiment may be effectively used for such objects that have undulated or grooved surfaces. Further, the chisels 112 are divergently arranged, so that an area of the object to be chiseled may be enlarged and scraping of corners may be readily achieved. Operation of the chisels 112 through the piston 82 by the compressed air is identical to those in the previous embodiments.

As described above with various embodiments, in accordance with the invention, the piston may be provided with the pneumatic switching function by mere combination of the cylinder with the piston which may give the striking action on the chisels, so that the simple construction of the mechanical and pneumatic driving mechanism for the chisels may be achieved and that the efficient striking action on the chisels may also be achieved. Thus, maintenance and replacement of the chisels may be convenient, resulting in low operation and maintenance costs.

Further, in accordance with the invention, the dust-suction means may be optionally provided with keeping the basic construction of the cylinder and the piston. In this case, only replacement of the back head, the cylinder bushing and the front head results in a low cost.

The surface-chiseling machine according to the invention may be manufactured in a compact size, so that the cylinder may be supported by the air cushion using the cylinder cover thereby to avoid the excessive force applied onto the chisels and to achieve the mechanical protection effectively. As a result, damage of the machine through operational errors may be effectively prevented.

Further, the direct striking action of the piston on the chisels allows the latter to be arranged divergently, thereby to enlarge the chiseling area of the object and to facilitate scraping of its corners.

Although the invention has been described hereinabove with reference to the preferred embodiments, it will be appreciated to a person skilled in the art that many variations and modifications may be made without departing from the spirit and scope of the invention.

What is claimed is :

1. A surface-chiseling machine for refractory, concrete of other materials, which comprises a piston having at its one end a step portion and on a side periphery at its other end a through-hole, and a cylinder forming a first air chamber on a closed side of the step portion of said piston, forming an exhausting channel communicated with the through-hole of said piston and having an air hole for feeding a pressure air to said first air chamber, said cylinder at its rear end being closed with a back head for forming therein a second air chamber while at its front end being closed with a front head which is provided with a plurality of chisel-inserting holes, into which holes are inserted chisels with their rear ends being contactable directly with a front face of said piston, each of said chisel at its rear end being provided with a protruded step to form on its one side a third air chamber for normally urging the chisel against the piston, said first and third air chambers being continuously fed with the pressure air for reciprocating said piston in a strike in which the second air chamber formed by said piston is communicated alternately with the exhausting channel or the first air chamber via the through-hole, thereby to strike the chisel.

2. A surface-chiseling machine according to claim 1, wherein the cylinder at its center is provided with a dust tube extending through the piston, the back head and the front head, and wherein the front head on its front periphery is provided with a dust-protection covering.

3. A surface-chiseling machine according to claim 1, wherein the front head at its part is provided with a sprinkler orifice for injecting or spraying water.

4. A surface-chiseling machine according to claim 1, wherein the front head and the back head for closing the cylinder at its either end are surrounded by a cylinder cover which at its either end is provided with a respective seal packing for maintaining an air-tight condition, and wherein the cylinder at its outer circumference is formed with an air chamber for enabling said cylinder to move forward or backward relative to said cylinder cover by an air cushion.

5. A surface-chiseling machine according to claim 1, wherein the plurality of chisels inserted into the front head are arranged with their front ends being protruded divergently.

* * * * *